(12) United States Patent
Spangler et al.

(10) Patent No.: US 10,822,963 B2
(45) Date of Patent: Nov. 3, 2020

(54) AXIAL FLOW COOLING SCHEME WITH CASTABLE STRUCTURAL RIB FOR A GAS TURBINE ENGINE

(71) Applicant: United Technologies Corporation, Farmington, CT (US)

(72) Inventors: Brandon W. Spangler, Vernon, CT (US); Adam P. Generale, Dobbs Ferry, NY (US)

(73) Assignee: Raytheon Technologies Corporation, Farmington, CT (US)

(*) Notice: Subject to any disclaimer, the term of this patent is extended or adjusted under 35 U.S.C. 154(b) by 40 days.

(21) Appl. No.: 16/210,696

(22) Filed: Dec. 5, 2018

(65) Prior Publication Data

US 2020/0182069 A1 Jun. 11, 2020

(51) Int. Cl.
*F01D 5/18* (2006.01)
*F01D 9/04* (2006.01)

(52) U.S. Cl.
CPC .............. *F01D 5/187* (2013.01); *F01D 9/041* (2013.01); *F05D 2240/126* (2013.01); *F05D 2260/22141* (2013.01)

(58) Field of Classification Search
None
See application file for complete search history.

(56) References Cited

U.S. PATENT DOCUMENTS

| | | | |
|---|---|---|---|
| 3,353,351 A | 11/1967 | Bill et al. | |
| 3,628,880 A * | 12/1971 | Smuland | F01D 5/189 |
| | | | 415/175 |
| 3,806,274 A * | 4/1974 | Moore | F01D 5/188 |
| | | | 416/97 R |
| 3,809,494 A | 5/1974 | Redman | |
| 6,382,907 B1 * | 5/2002 | Bregman | F01D 5/187 |
| | | | 415/115 |
| 6,742,991 B2 | 6/2004 | Soechting et al. | |
| 6,837,683 B2 | 1/2005 | Dailey | |
| 7,322,796 B2 | 1/2008 | Pietraszkiewicz et al. | |
| 7,497,655 B1 | 3/2009 | Liang | |

(Continued)

FOREIGN PATENT DOCUMENTS

| | | |
|---|---|---|
| EP | 1136651 A1 | 9/2001 |
| EP | 1221538 A2 | 7/2002 |

(Continued)

OTHER PUBLICATIONS

U.S. Non-Final Office Action dated Apr. 8, 2020 issued in corresponding U.S. Appl. No. 16/210,606.

(Continued)

*Primary Examiner* — Kenneth J Hansen
*Assistant Examiner* — Jason Fountain
(74) *Attorney, Agent, or Firm* — Bachman & LaPointe, P.C.

(57) ABSTRACT

A component for a gas turbine engine includes a interleaved structural rib that extends between the first multiple of axial standoff ribs and the second multiple of axial standoff ribs. The second multiple of structural rib span segments that extend from the second sidewall, the first multiple of structural rib span segments interleaved with the second multiple of structural rib span segments to form an interleaved structural rib that extends between the first sidewall and the second sidewall.

19 Claims, 13 Drawing Sheets

(56) References Cited

U.S. PATENT DOCUMENTS

| | | | |
|---|---|---|---|
| 7,674,092 B2* | 3/2010 | Annerfeldt | F01D 5/187 |
| | | | 416/97 R |
| 8,348,613 B2 | 1/2013 | Gregg et al. | |
| 8,757,974 B2 | 6/2014 | Propheter-Hinckley et al. | |
| 9,181,808 B2* | 11/2015 | Carter | F01D 5/187 |
| 9,863,255 B2 | 1/2018 | Mugglestone | |
| 10,196,906 B2* | 2/2019 | Lee | F01D 5/187 |
| 2007/0172354 A1* | 7/2007 | Annerfeldt | F01D 5/187 |
| | | | 416/97 R |
| 2013/0034429 A1* | 2/2013 | Carter | F01D 5/187 |
| | | | 415/178 |
| 2014/0075947 A1 | 3/2014 | Gautschi et al. | |
| 2014/0328669 A1* | 11/2014 | Bregman | F01D 5/187 |
| | | | 415/115 |

FOREIGN PATENT DOCUMENTS

| | | |
|---|---|---|
| EP | 3321474 A1 | 5/2018 |
| GB | 1322801 | 7/1973 |
| GB | 2096525 A | 10/1982 |
| GB | 2460936 A | 12/2009 |
| JP | S61118501 A | 6/1986 |
| WO | 2005083235 A1 | 9/2005 |
| WO | 2013077761 A1 | 5/2013 |
| WO | 2015012918 A2 | 1/2015 |
| WO | 2016036366 A1 | 3/2016 |

OTHER PUBLICATIONS

EP Search Report dated Mar. 31, 2020 issued for corresponding European Patent Application No. 19213966.5.

EP Search Report dated Mar. 31, 2020 issued for corresponding European Patent Application No. 19213973.1.

* cited by examiner

AXIAL FLOW COOLING SCHEME WITH CASTABLE STRUCTURAL RIB FOR A GAS TURBINE ENGINE

BACKGROUND

The present disclosure relates to a gas turbine engine and, more particularly, to a cooling scheme for an airfoil.

Gas turbine engines typically include a compressor section to pressurize flow, a combustor section to burn a hydrocarbon fuel in the presence of the pressurized air, and a turbine section to extract energy from the resultant combustion gases. The combustion gases commonly exceed 2000 degrees F. (1093 degrees C.).

Cooling of engine components is performed via communication of cooling flow through airfoil cooling circuits. Due to casting size limitations of trailing edge slots from the airfoil cooling circuit, trailing edge flow provides a significant portion of the cooling flow in a component. Axial flow baffle designs can utilize this trailing edge flow efficiently to cool the balance of the component, eliminating the complexity of dedicated cooling flow in other regions of the component. However, in order to prevent the pressure and suction side walls from bulging with minimal weight impact, stiffening features are utilized to tie the pressure and suction side walls together which may further interfere with the flow.

SUMMARY

A component for a gas turbine engine according to one disclosed non-limiting embodiment of the present disclosure includes a first sidewall; a first multiple of structural rib span segments that extend from the first sidewall; a second sidewall; a second multiple of structural rib span segments that extend from the second sidewall, the first multiple of structural rib span segments interleaved with the second multiple of structural rib span segments to form an interleaved structural rib that extends between the first sidewall and the second sidewall.

A further embodiment of any of the foregoing embodiments of the present disclosure includes that the first sidewall is a pressure side and the second sidewall is a suction side of an airfoil.

A further embodiment of any of the foregoing embodiments of the present disclosure includes that the component is a vane and the first sidewall and the second sidewall extend between an outer vane platform and an inner vane platform.

A further embodiment of any of the foregoing embodiments of the present disclosure includes that the interleaved structural rib extends between an outer vane platform and an inner vane platform.

A further embodiment of any of the foregoing embodiments of the present disclosure includes a baffle adjacent to the interleaved structural rib.

A further embodiment of any of the foregoing embodiments of the present disclosure includes a forward baffle section adjacent to the interleaved structural rib and an aft baffle section adjacent to the interleaved structural rib.

A further embodiment of any of the foregoing embodiments of the present disclosure includes a first multiple of axial standoff ribs extending from the first sidewall and a second multiple of axial standoff ribs extending from the second sidewall, wherein each of the first multiple of axial standoff ribs is staggered from each of the second multiple of axial standoff ribs.

A further embodiment of any of the foregoing embodiments of the present disclosure includes that the interleaved structural rib is corrugated.

A further embodiment of any of the foregoing embodiments of the present disclosure includes that the interleaved structural rib and the first and second sidewalls form a multiple of axial crossover passages.

A further embodiment of any of the foregoing embodiments of the present disclosure includes that the multiple of axial crossover passages further include a first multiple of axial crossover passages adjacent to the first sidewall and a second multiple of axial crossover passages adjacent to the second sidewall, wherein the second multiple of axial crossover passages are staggered from the first multiple of axial crossover passages.

A further embodiment of any of the foregoing embodiments of the present disclosure includes that each of the multiple of axial crossover passages connect a forward cavity to an aft cavity of the component.

A further embodiment of any of the foregoing embodiments of the present disclosure includes that a distance between each of the first multiple of axial crossover passages is larger than a size of one of the first multiple of axial crossover passages, and wherein a distance between each of the second multiple of axial crossover passages is larger than a size of one of the second multiple of axial crossover passages.

A vane for a gas turbine engine according to one disclosed non-limiting embodiment of the present disclosure includes a first sidewall; a first multiple of structural rib span segments that extend from the first sidewall; a second sidewall; a second multiple of structural rib span segments that extend from the second sidewall, the first multiple of structural rib span segments interleaved with the second multiple of structural rib span segments to form an interleaved structural rib that extends between the first sidewall and the second sidewall; and a baffle adjacent to the interleaved structural rib.

A further embodiment of any of the foregoing embodiments of the present disclosure includes a forward baffle section adjacent to the interleaved structural rib and an aft baffle section adjacent to the interleaved structural rib.

A further embodiment of any of the foregoing embodiments of the present disclosure includes that the interleaved structural rib, the first sidewall and the second sidewall form a multiple of axial crossover passages.

A further embodiment of any of the foregoing embodiments of the present disclosure includes that the interleaved structural rib forms a first multiple of axial crossover passages on a pressure side and a second multiple of axial crossover passages on a suction side.

A further embodiment of any of the foregoing embodiments of the present disclosure includes that the first multiple of axial crossover passages are staggered from the second multiple of axial crossover passages.

A method of manufacturing a component of a gas turbine engine according to one disclosed non-limiting embodiment of the present disclosure includes forming a first core die portion with a first multiple of structural rib span segments that extend from a first sidewall; forming a second core die portion with a second multiple of structural rib span segments that extend from a second sidewall; assembling the first core die portion and the second core die portion such that the first multiple of structural rib span segments are interleaved with the second multiple of structural rib span segments to form an interleaved structural rib; injecting core material into the core die to create a core; separating the core die portions; inserting the core into a wax die; injecting wax around the core; forming a ceramic shell around the wax; removing the wax; injecting molten material into the shell and letting cool; and removing the ceramic shell and core material.

A further embodiment of any of the foregoing embodiments of the present disclosure includes that a draft angle on the surfaces of the first multiple of structural rib span segments and the surfaces of the second multiple of structural rib span segments is between 1 and 5 degrees.

A further embodiment of any of the foregoing embodiments of the present disclosure includes that a parting line between the first core die portion and the second core die portion zig-zags between the first multiple of axial crossover passages and the second multiple of axial crossover passages.

The foregoing features and elements may be combined in various combinations without exclusivity, unless expressly indicated otherwise. These features and elements as well as the operation thereof will become more apparent in light of the following description and the accompanying drawings. It should be appreciated; however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
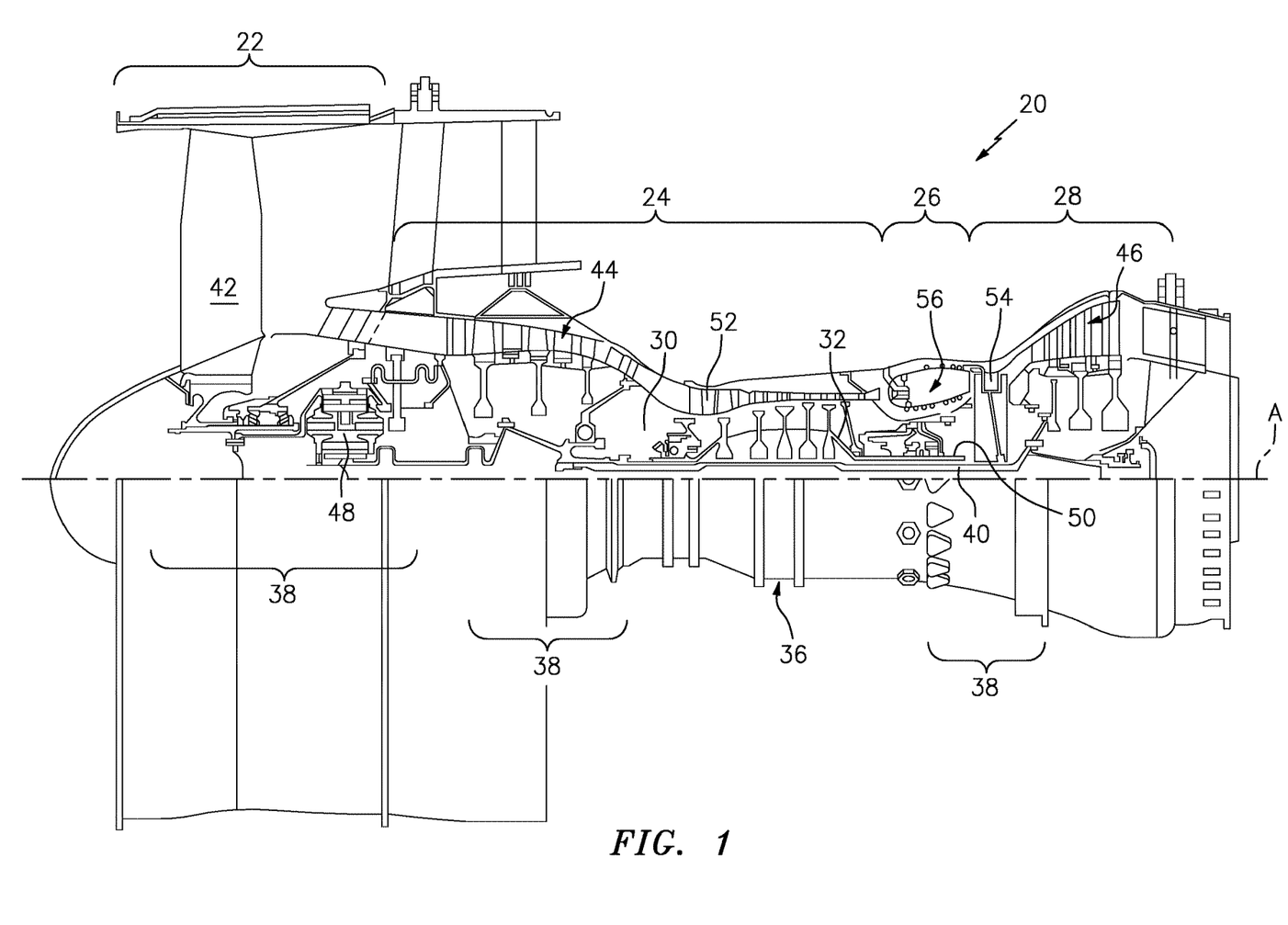
FIG. 1 is a schematic cross-section of an example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, the concepts described herein may be applied to other turbine engine architectures such as turbojets, turboshafts, and three-spool (plus fan) turbofans.

The engine 20 generally includes a low spool 30 and a high spool 32 mounted for rotation about an engine central longitudinal axis A relative to an engine case structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core flow is compressed by the LPC 44 then the HPC 52, mixed with the fuel and burned in the combustor 56, then the combustion gasses are expanded over the HPT 54 and the LPT 46. The turbines 46, 54 rotationally drive the respective low spool 30 and high spool 32 in response to the expansion. The main engine shafts 40, 50 are supported at a plurality of points by bearing assemblies 38 within the engine case structure 36.

Figure 2:
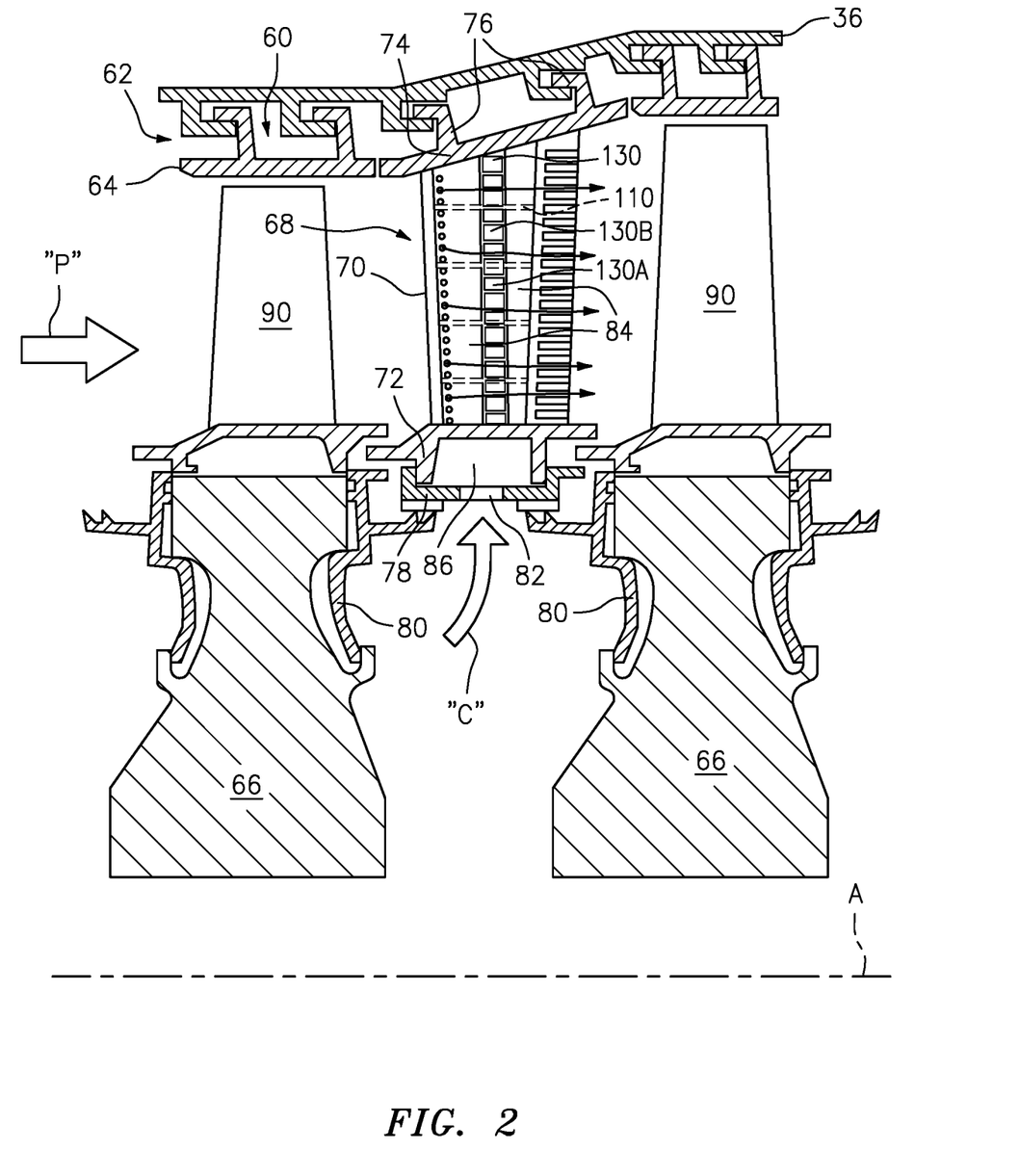
FIG. 2 is an schematic cross-section of an engine turbine section including a vane ring.
Figure 3:
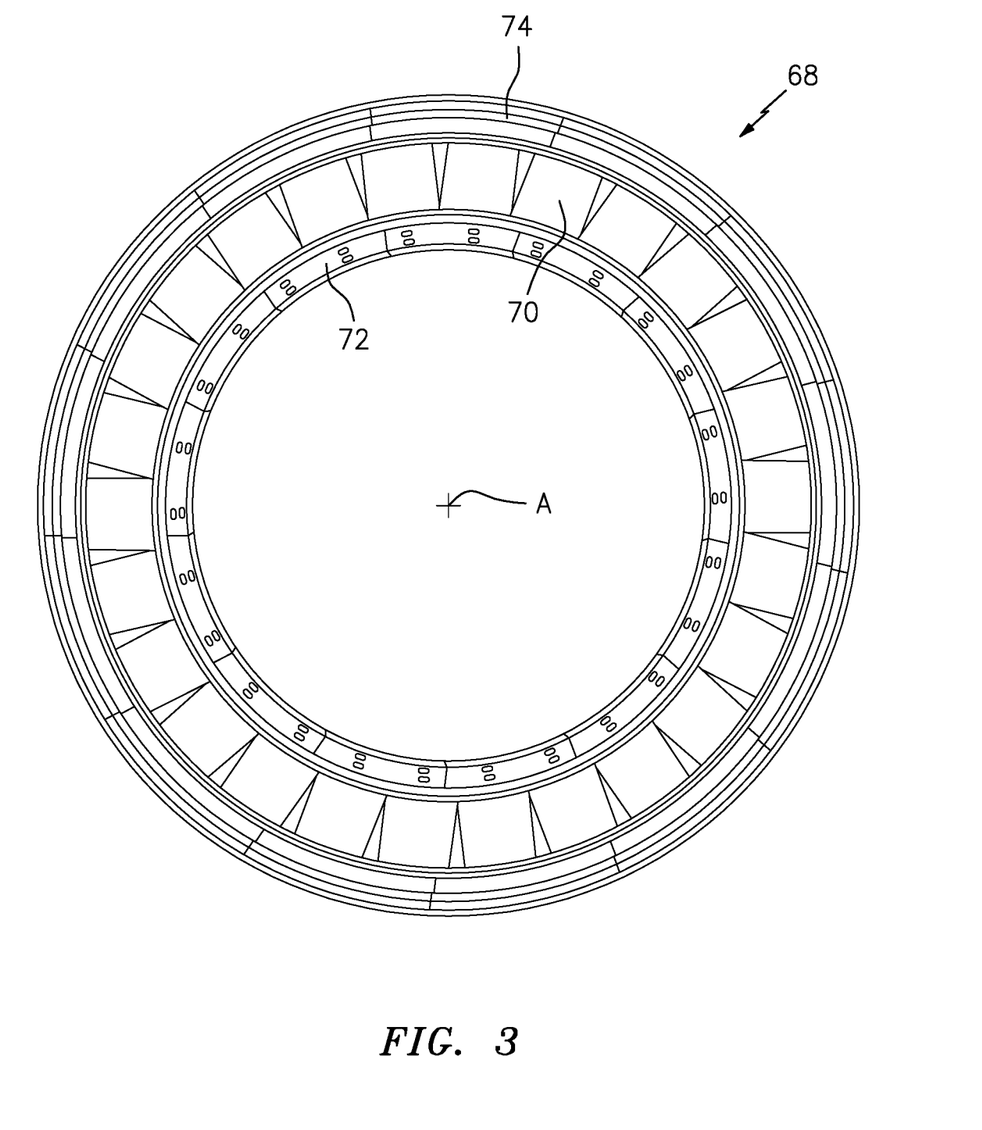
FIG. 3 is a front view of the vane ring.
Figure 4:
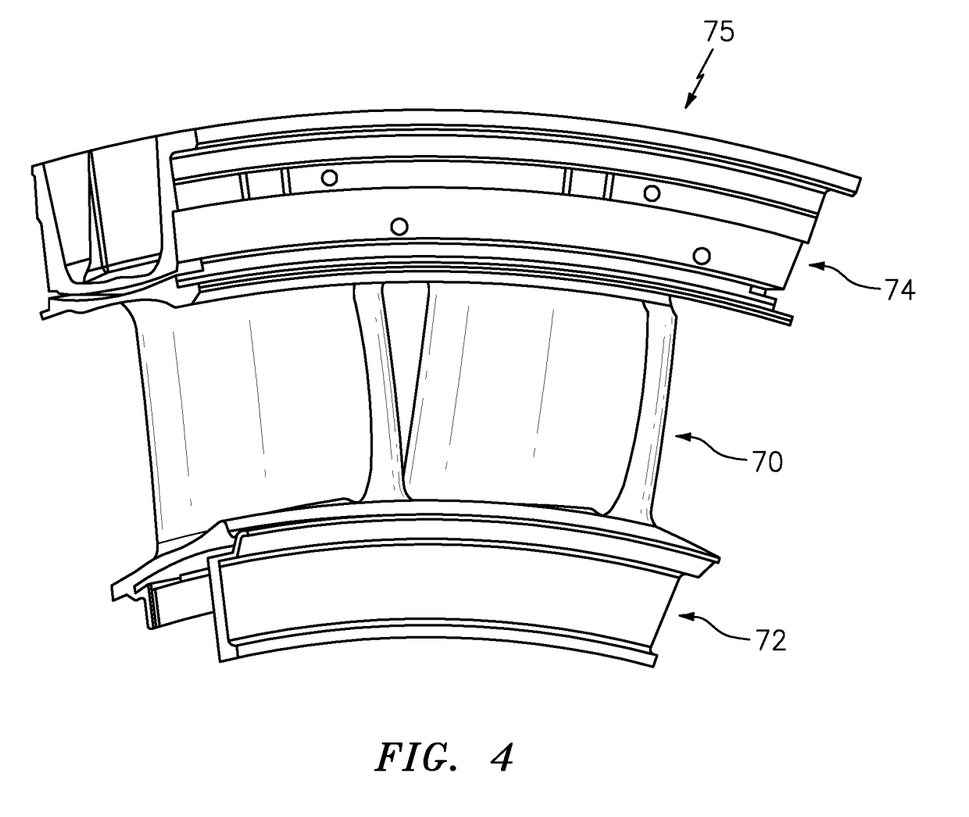
FIG. 4 is a perspective view of one example vane doublet used in the vane ring that includes two airfoils.

With reference to FIG. 2, an enlarged schematic view of a portion of the turbine section 28 is shown by way of example. A full ring shroud assembly 60 within the engine case structure 36 supports a blade outer air seal (BOAS) assembly 62. The blade outer air seal (BOAS) assembly 62 contains a multiple of circumferentially distributed BOAS 64 proximate to a rotor assembly 66. The full ring shroud assembly 60 and the blade outer air seal (BOAS) assembly 62 are axially disposed adjacent to a first stationary vane ring 68 (also shown in FIG. 3). The vane ring 68 includes an array of vanes 70 between a respective inner vane platform 72 and an outer vane platform 74. In this embodiment, the array of vanes 70 are formed as a multiple of vane doublets 75 (one shown in FIG. 4), however, other turbine components, singlets, vanes and other components will benefit herefrom. The outer vane platform 74 attach the vane ring 68 to the engine case structure 36.

The blade outer air seal (BOAS) assembly 62, the inner vane platform 72 and the outer vane platform 74 bounds the working medium combustion gas flow in a primary flow path P. The vane rings 68 align the flow while the rotor blades 90 collect the energy of the working medium combustion gas flow to drive the turbine section 28 which in turn drives the compressor section 24. The single rotor assembly 66 and the single stationary vane ring 68 are described in detail as representative of any number of multiple engine stages.

The first stationary vane ring 68 may be mounted to the engine case structure 36 by a multiple of segmented hooked rails 76 that extend from the outer vane platform 74. A full hoop inner air seal 78 that attaches to the inner vane platform 72 provides a seal surface for a full hoop cover plate 80 mounted to each rotor assembly 66. The full hoop inner air seal 78 includes a multiple of feed passages 82 that supply cooling air "C" to an airfoil cooling circuit 84 distributed within each respective vane 70. Each vane 70 receives the cooling air "C" from multiple of feed passages 82 that feeds a plenum 86 thence into each airfoil cooling circuit 84.

Figure 5:
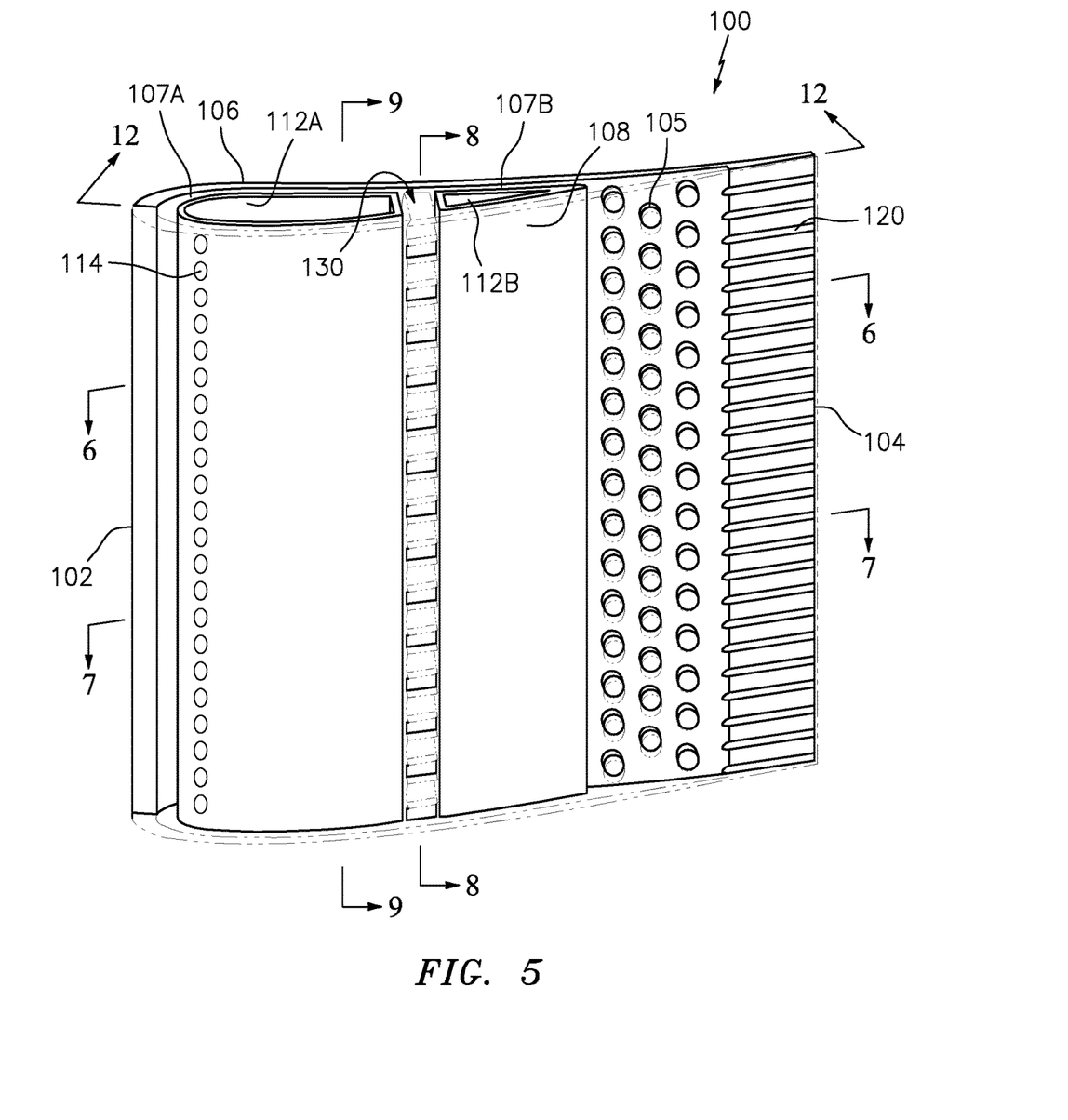
FIG. 5 is a partial phantom perspective view of a single airfoil within the vane doublet.

With reference to FIG. 5, one disclosed embodiment of the vane 70 includes an airfoil 100 that defines a blade chord between a leading edge 102, which may include various forward and/or aft sweep configurations, and a trailing edge 104. A first sidewall 106, that may be concave to define a pressure side, and a second sidewall 108, that may be convex to define a suction side, are joined at the leading edge 102 and at the axially spaced trailing edge 104 to create an internal cavity 107. An interleaved structural rib 130 extends between the first sidewall 106 and the second sidewall 108, supporting the first and second sidewalls 106, 108 and dividing the internal cavity 107 into a forward cavity 107A and an aft cavity 107B. A multiple of pedestals 105 may be located toward the trailing edge 104 to provide further support thereof.

Figure 6:
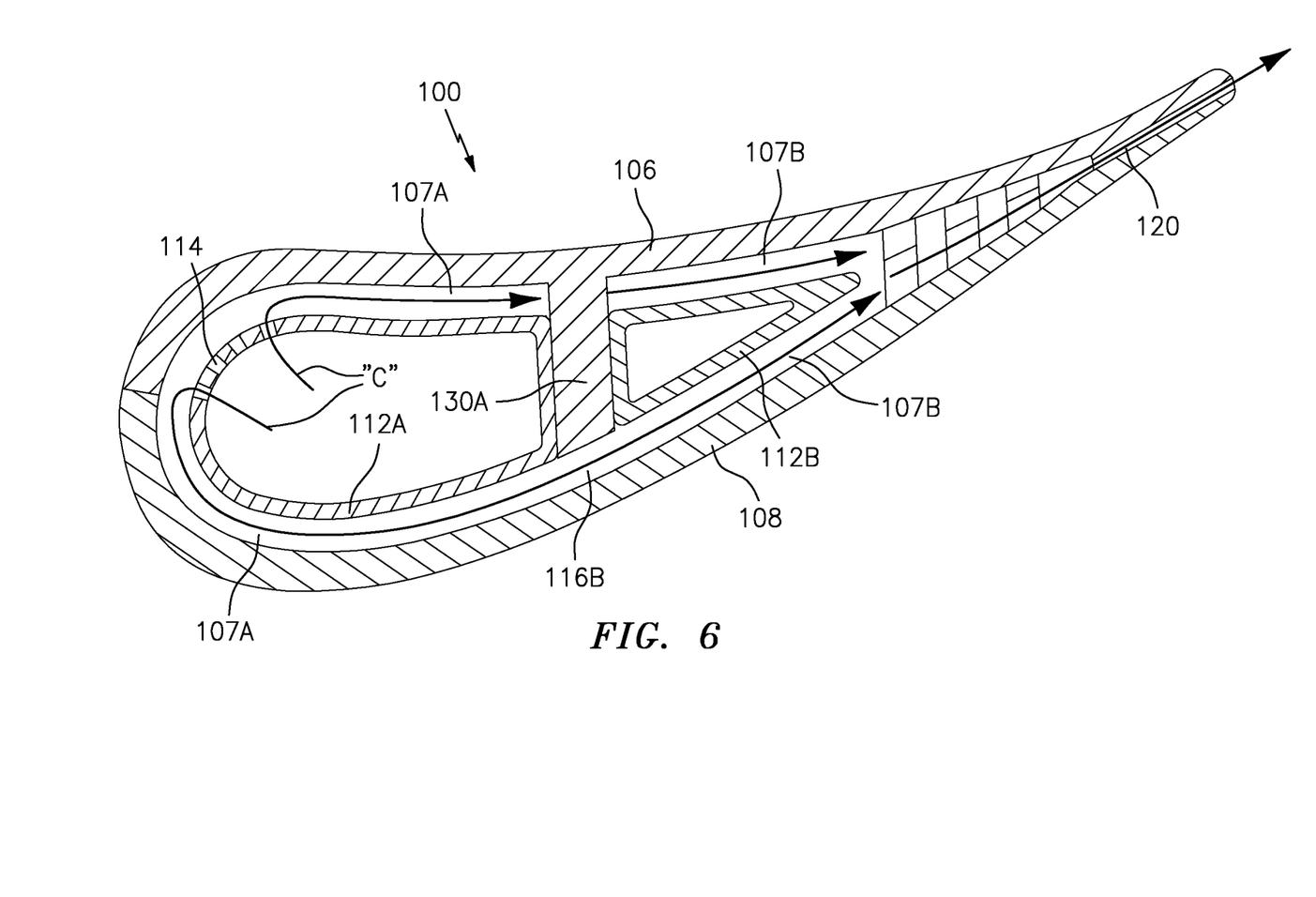
FIG. 6 is a sectional view taken along line 6-6 in FIG. 5.
Figure 7:
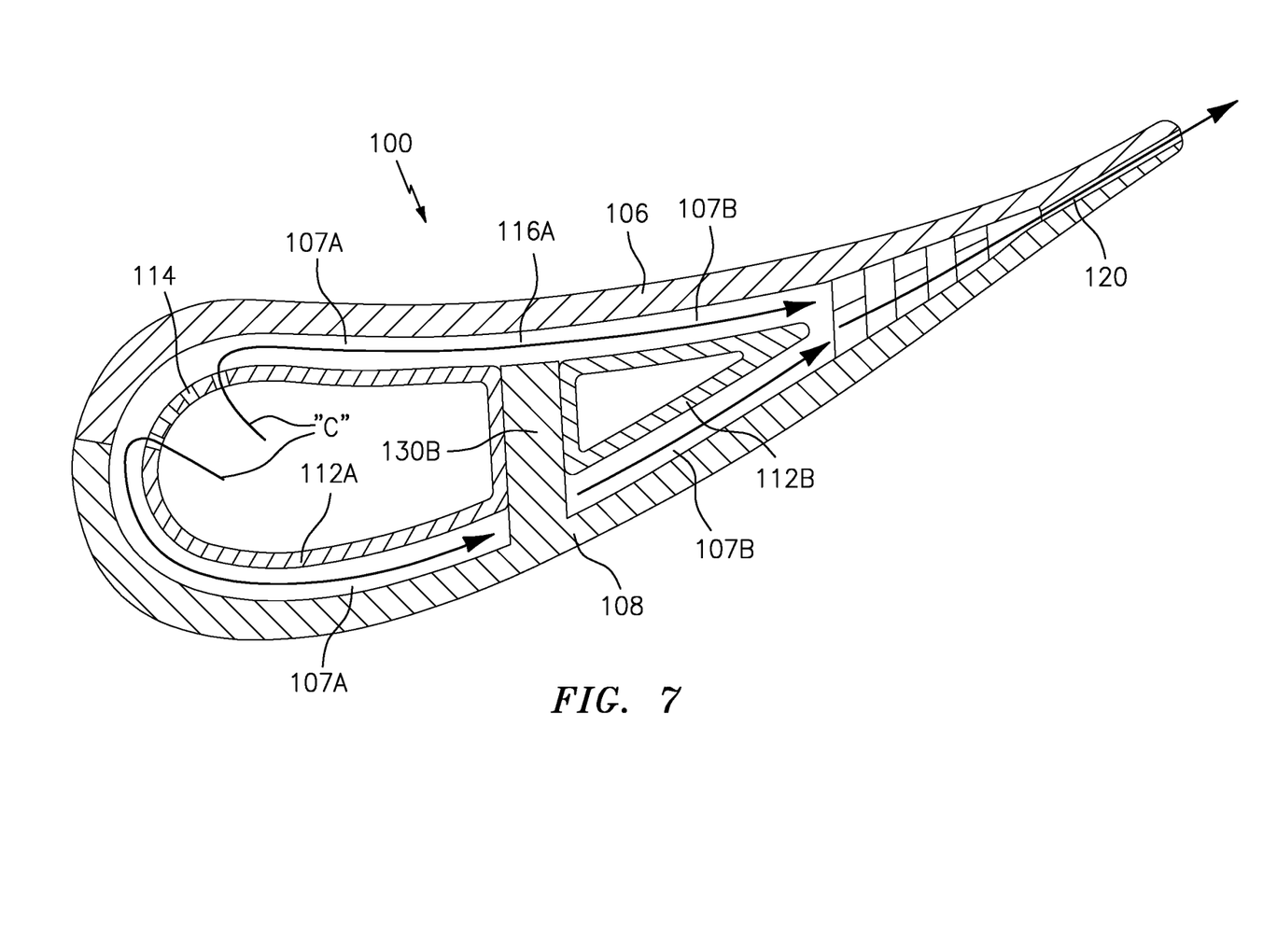
FIG. 7 is a sectional view taken along line 7-7 in FIG. 5.

The first sidewall 106 and the second sidewall 108 may include a multiple of standoff features 110 (FIG. 9) such as cylindrical pin fins, racetrack pin fins, spherical bumps, or ribs that support and position a baffle 112 within the internal cavity 107. The baffle 112 provides a conduit through which flow, electrical wires, or other may be directed span wise through the airfoil 100. In this embodiment, the baffle 112 includes a forward section 112A and an aft section 112B adjacent to the interleaved structural rib 130. Cooling air "C" from the baffle 112A is ejected through apertures 114 in a leading edge 102 of the baffle 112A which then flows around the leading edge 102 of baffle 112A and between the sidewalls 106, 108 and baffle sections 112A, 112B until ejected through the trailing edge apertures 120 (FIGS. 6 and 7). Other apertures may alternatively or additionally be provided to feed the cooling air into the space between the baffle 112 and the sidewalls 106, 108.

Figure 8:
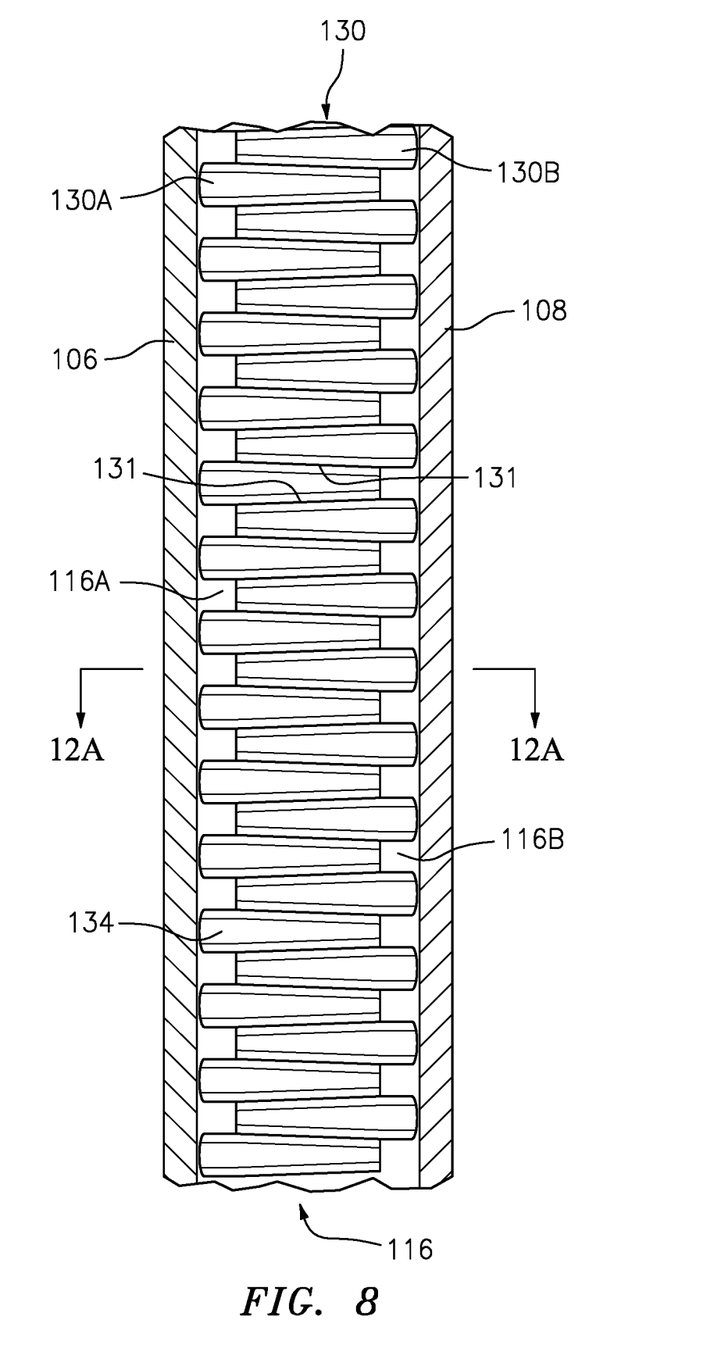
FIG. 8 is a sectional view taken along line 8-8 in FIG. 5.

FIG. 8 shows that the interleaved structural rib 130 is manufactured of a first multiple of structural rib span segments 130A that extend from the first sidewall 106 and a second multiple of structural rib span segments 130B that extend from the second sidewall 108. The first multiple of structural rib span segments 130A are interleaved with the second multiple of structural rib span segments 130B such that the first multiple of structural rib span segments 130A stop short of the second sidewall 108 and the second multiple of structural rib span segments 130B stop short of the first sidewall 106. The first sidewall 106 is tied to the second sidewall 108 thru the solidly joined interface 131 between the first multiple of structural rib span segments 130A and the second multiple of structural rib span segments 130B, preventing the thin sidewalls 106, 108 from bulging.

Figure 9:
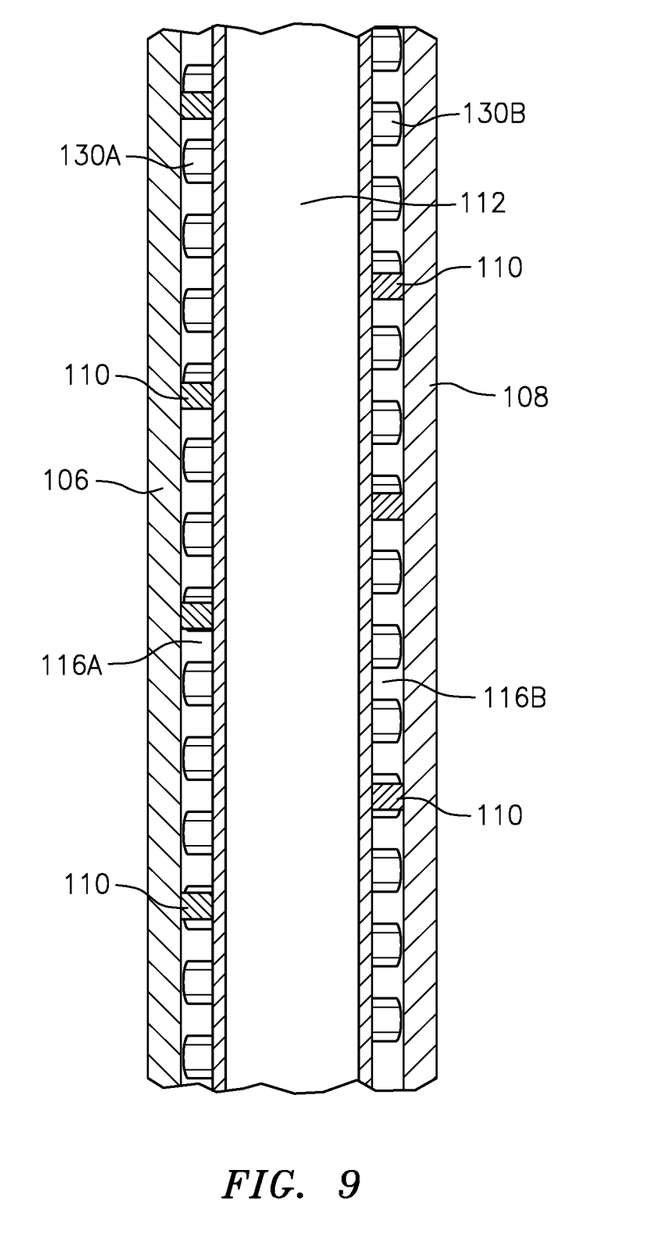
FIG. 9 is a sectional view taken along line 9-9 in FIG. 5.
Figure 14:
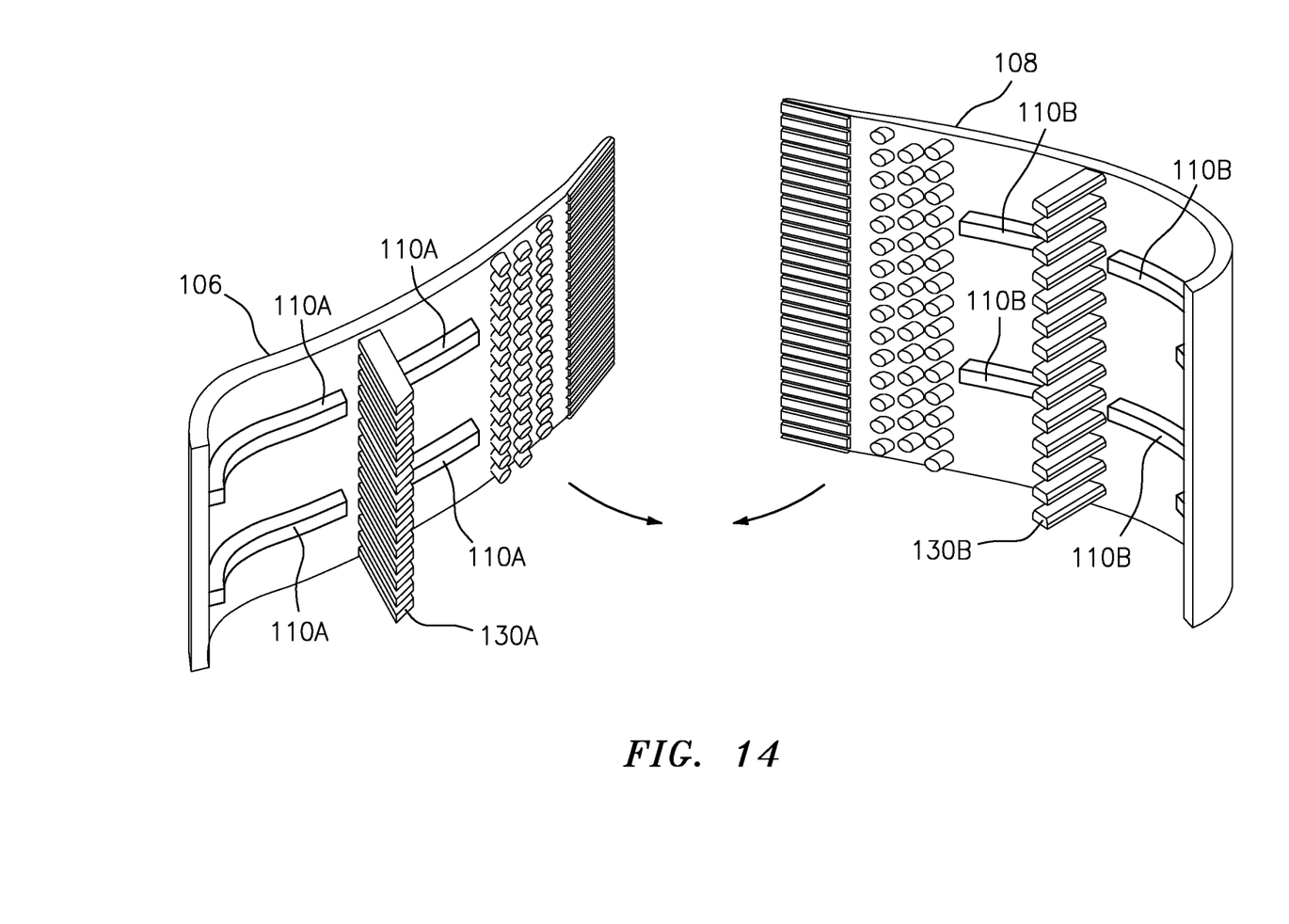
FIG. 14 is an exploded view of the airfoil within the vane doublet.

The interleaved structural rib 130 provides staggered axial crossover passages 116 (FIG. 8) adjacent to the respective sidewalls 106, 108. Due to the interleave, the axial crossover passages 116A adjacent to the first sidewall 106 are offset span wise from the axial passages 116B adjacent to the second sidewall 108. In one embodiment shown in FIG. 9 and FIG. 14, the standoff features that support the baffle 112 are axial standoff ribs 110A, 110B that extend between the leading edge 102 and the trailing edge 104. In this embodiment, the axial standoff ribs 110A, 110B are also staggered span wise to minimize impediment of the cooling flow travelling axially from the leading edge 102 to the trailing edge 104. In other words, the interleaved structural rib 130 forms the staggered axial crossover passages 116 such that the axial standoff ribs 110A, 110B correspond therewith (FIG. 9).

Figure 10:
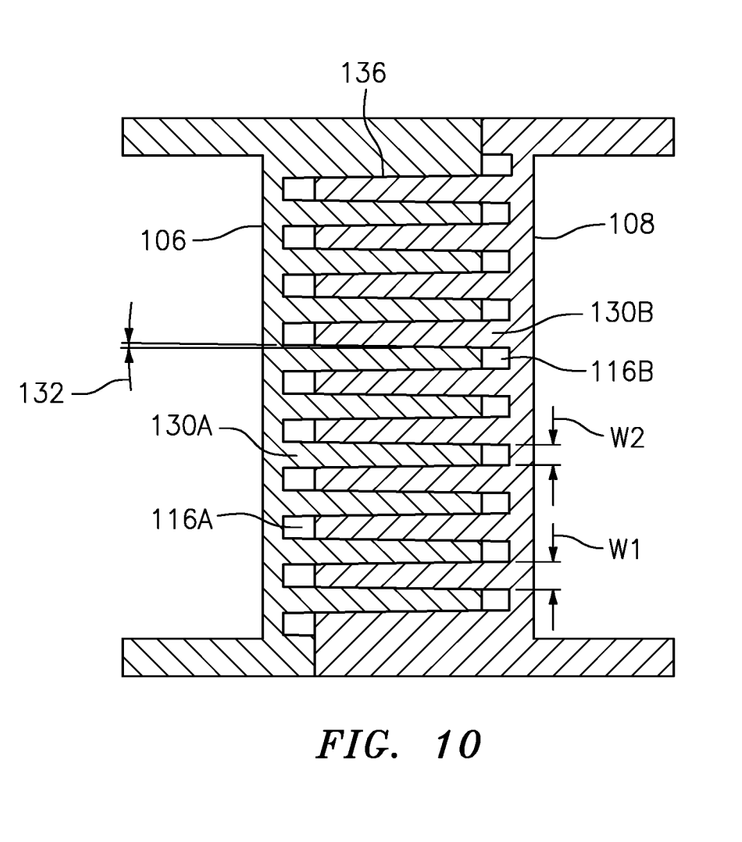
FIG. 10 is a sectional view taken along line 10-10 in FIG. 5 illustrating an alternate draft angle for a core die for forming the airfoil within the vane doublet.
Figure 11:
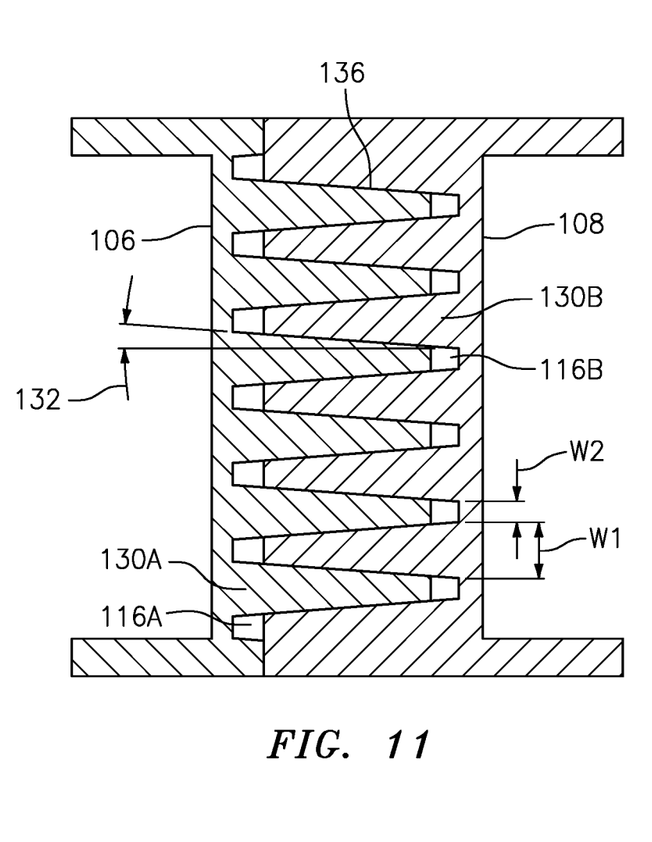
FIG. 11 is a sectional view taken along line 11-11 in FIG. 5 illustrating an alternate draft angle for a core die for forming the airfoil within the vane doublet.
Figure 12:
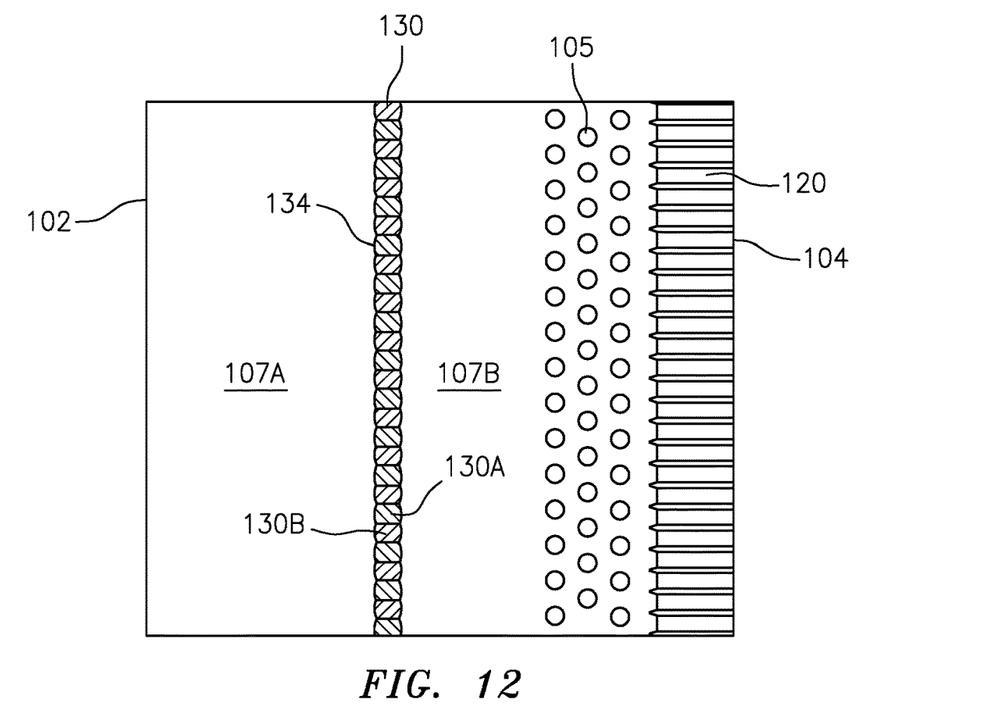
FIG. 12 is a sectional view taken along line 12-12 in FIG. 5 showing the wavy structural rib.
Figure 12A:
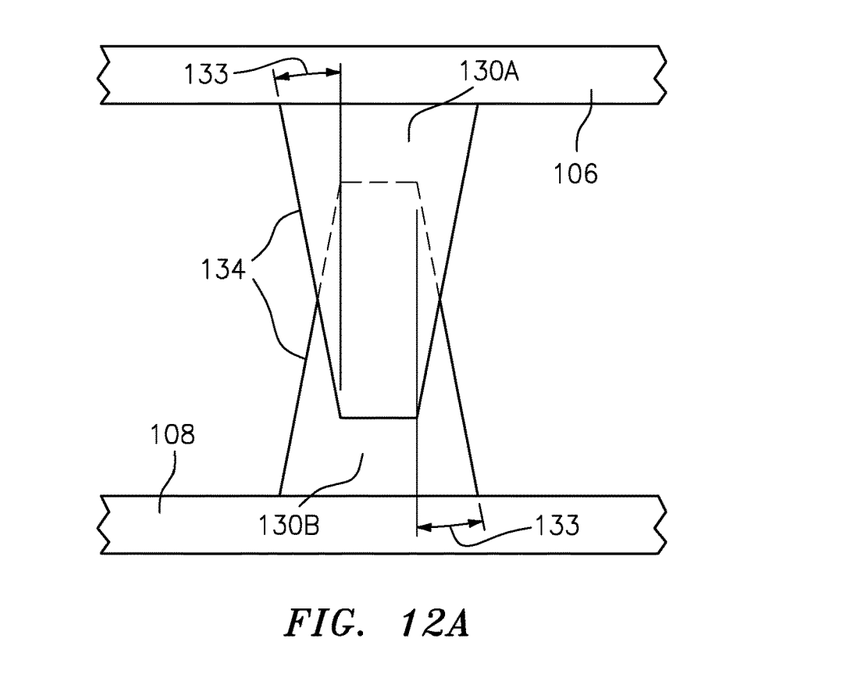
FIG. 12A is a schematic view showing the wavy structural rib interface.

The first and second multiple of structural rib span segments 130A, 130B, in this embodiment, include a draft angle 132 between 1-5 degrees (FIG. 10, 11) to facilitate the interleave thereof. The draft angle will control the number and size of axial crossover passages 116. Adjacent to the corresponding axial crossover passage 116, the width W1 of the first and second structural rib span segments 130A, 130B will be larger than the width W2 of the axial crossover passages 116 due to draft angle, which may result in blockage greater than 50%. That is, because draft angles are required on some surfaces of the core die so that the core die can be separated without being hung up on the ceramic core, the distance W1 between the crossover holes will always be larger than the size W2 of the crossover hole, resulting in blockages that are greater than 50%. In addition, the leading edge and trailing edge draft angles 133 on the first and second multiple of structural rib span segments 130A, 130B that form the interleaved structural rib 130 result in the interleaved structural rib 130 having a wavy or corrugated surface 134 (FIGS. 12 and 12A).

Figure 13:
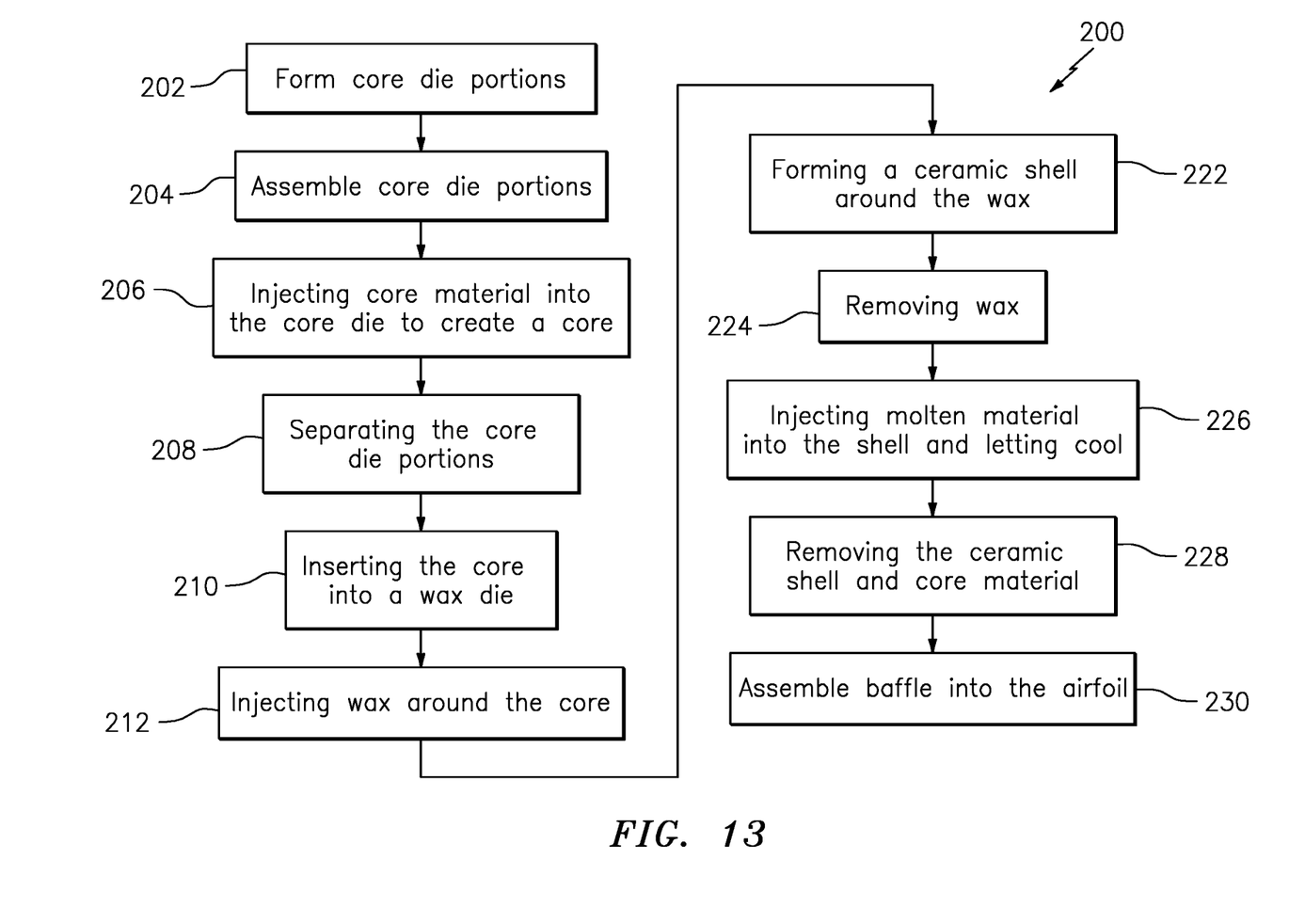
FIG. 13 is a block diagram of a method for the airfoil within the vane doublet.

With reference to FIG. 13, while not to be limited to any single method, a method 200 for manufacturing the vane with the interleaved structural rib 130 initially includes forming a core die as two halves (202). One half of the core die includes the pressure side wall complete with pressure side half of trailing edge pedestals, heat transfer features, axial standoff ribs and the first multiple of structural rib span segments 130A that extend from the first sidewall 106. The other half of the die includes the suction side wall complete with suction side half of trailing edge pedestals, heat transfer features, axial standoff ribs, and the second multiple of structural rib span segments 130B that extend from the second sidewall 108. Next, the core halves are assembled to form the interleaved structural rib 130 (204). When the halves are assembled, the parting line 136 between halves of the core die zig-zags (FIG. 11) between the pressure side crossover passages 116A and the suction side crossover passages 116B.

Next, the core material is injected into the core die around the structural rib span segments 130A, 130B (206). Next, the core die halves are separated (208) which leaves a ceramic core with the associated axial crossover passages 116 connecting the core representing the first cavity 107A to the core representing the second cavity 107B. Because the parting line 136 of the core die zig-zags between the pressure side crossover passages and the suction side crossover passages, the halves of the core die can be pulled apart without being trapped by the core.

Next, the core is inserted into a wax die (210) and wax is injected (212) around the core. The waxed core is removed from the wax die and a ceramic shell is formed around the wax (222). The shell and the core define a mold to cast complex exterior and interior geometries and may be formed of refractory metals, ceramic, or hybrids thereof. The core forms the internal surfaces such as that which defines the multiple of axial standoff ribs 110 and the interleaved structural rib 130. That is, during the casting process, the core fills a selected volume within the shell that, when removed from the finished casting, defines the array of internal passageways utilized for cooling flow.

After hardening, the wax is removed (224) and a desired material, that may include but not be limited to a nickel based superalloy, cobalt based superalloy, iron based superalloy, and mixtures thereof, is injected into the mold (226).

Finally, the desired material is allowed to cool and the ceramic shell and core material is removed (228). After removal the baffle 112 is assembled into the airfoil 100 (230). It should be appreciated that other steps may alternatively or additionally be provided. Alternatively, or in addition, a single crystal starter seed or grain selector may be utilized to enable a single crystal to form when solidifying the component. The solidification may utilize a chill block in a directional solidification furnace. The directional solidification furnace has a hot zone that may be induction heated and a cold zone separated by an isolation valve. The chill block and may be elevated into the hot zone and filled with molten super alloy. Casting is typically performed under an inert atmosphere or vacuum to preserve the purity of the casting.

Alternatively, the vane may be formed via an additive manufacturing process. The additive manufacturing process sequentially builds-up layers of materials material that include but are not limited to, various titanium alloys including Ti 6-4, Inconel 625 Alloy, Inconel 718 Alloy, Haynes230 Alloy, stainless steel, tool steel, cobalt chrome, titanium, nickel, aluminum, ceramics, plastics and others in atomized powder material form. In other examples, the starting materials can be non-atomized powders, filled or unfilled resins in liquid, solid or semisolid forms, and wire-based approaches such as wire arc for metals and Fused Deposition Modeling (FDM) for polymers. Alloys such as Inconel 625, Inconel 718 and Haynes 230 may have specific benefit for high temperature environments, such as, for example, environments typically encountered by aerospace and gas turbine engine articles. Examples of the additive manufacturing processes include, but are not limited to, SFF processes, 3-D printing methods, Sanders Modelmaker, Selective Laser Sintering (SLS), 3D systems thermojet, ZCorp 3D printing Binder jetting, Extrude ProMetal 3D printing, stereolithography, Layered Object Manufacturing (LOM), Fused Deposition Modeling (FDDM), Electron Beam Sintering (EBS), Direct Metal Laser Sintering (DMLS), Electron Beam Melting (EBM), Electron Beam Powder Bed Fusion (EB-PBF), Electron Beam Powder Wire (EBW), Laser Engineered Net Shaping (LENS), Laser Net Shape Manufacturing (LNSM), Direct Metal Deposition (DMD), Laser Powder Bed Fusion (L-PBF), Digital Light Synthesis™ and Continuous Liquid Interface Production (CLIP™). Although particular additive manufacturing processes are recited, any rapid manufacturing method can alternatively or additionally be used. In addition while additive manufacturing is the envisioned approach for fabrication of vanes 70, alternate embodiments may utilize alternate manufacturing approaches including cast, brazed, welded or diffusion bonded structures.

The geometry provides the stiffness required to prevent airfoil bulge while allowing cooling flow to travel axially from the leading edge to trailing edge with minimal pressure loss. Moreover, although described with respect to vanes, the embodiments set forth in this application may be applied to other components of the engine, such as blades.

Although particular step sequences are shown, described, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason, the appended claims should be studied to determine true scope and content.

What is claimed:

1. A component for a gas turbine engine, comprising:
   a first sidewall;
   a first multiple of structural rib span segments that extend from the first sidewall;
   a second sidewall; and
   a second multiple of structural rib span segments that extend from the second sidewall, the first multiple of structural rib span segments interleaved with the second multiple of structural rib span segments to form an interleaved structural rib that extends between the first sidewall and the second sidewall, wherein at least one of the first multiple structural rib span segments is directly abutting two of the second multiple of structural rib segments, the interleaved structural rib provides a multiple of axial crossover passages that are staggered adjacent to the respective sidewalls, the first and second multiple of structural rib span segments form a draft angle to control a number and a size of the multiple of axial crossover passages.

2. The component as recited in claim 1, wherein the first sidewall is a pressure side and the second sidewall is a suction side of an airfoil, a width W1 of the first and second structural rib span segments larger than a width W2 of the axial crossover passages due to the draft angle to form a blockage greater than 50%.

3. The component as recited in claim 2, wherein the component is a vane and the first sidewall and the second sidewall extend between an outer vane platform and an inner vane platform.

4. The component as recited in claim 3, wherein the interleaved structural rib extends between the outer vane platform and the inner vane platform.

5. The component as recited in claim 1, further comprising a baffle adjacent to the interleaved structural rib.

6. The component as recited in claim 1, further comprising a forward baffle section adjacent to the interleaved structural rib and an aft baffle section adjacent to the interleaved structural rib.

7. The component as recited in claim 1, further comprising a first multiple of axial standoff ribs extending from the first sidewall and a second multiple of axial standoff ribs extending from the second sidewall, wherein each of the first multiple of axial standoff ribs is staggered from each of the second multiple of axial standoff ribs.

8. The component as recited in claim 1, wherein the interleaved structural rib is corrugated.

9. The component as recited in claim 1, wherein the multiple of axial crossover passages further include a first multiple of axial crossover passages adjacent to the first sidewall and a second multiple of axial crossover passages adjacent to the second sidewall, wherein the second multiple of axial crossover passages are staggered from the first multiple of axial crossover passages.

10. The component as recited in claim 9, wherein each of the multiple of axial crossover passages connect a forward cavity to an aft cavity of the component.

11. The component as recited in claim 1, wherein a width W1 of the first and second structural rib span segments larger than a width W2 of the axial crossover passages due to the draft angle to form a blockage greater than 50%.

12. A component for a gas turbine engine, comprising:
a first sidewall;
a first multiple of structural rib span segments that extend from the first sidewall;
a second sidewall; and
a second multiple of structural rib span segments that extend from the second sidewall, the first multiple of structural rib span segments interleaved with the second multiple of structural rib span segments to form an interleaved structural rib that extends between the first sidewall and the second sidewall, wherein at least one of the first multiple structural rib span segments is directly abutting two of the second multiple of structural rib segments, wherein the interleaved structural rib and the first and second sidewalls form a multiple of axial crossover passages, the multiple of axial crossover passages further include a first multiple of axial crossover passages adjacent to the first sidewall and a second multiple of axial crossover passages adjacent to the second sidewall, wherein the second multiple of axial crossover passages are staggered from the first multiple of axial crossover passages, wherein a distance between each of the first multiple of axial crossover passages is larger than a size of one of the first multiple of axial crossover passages, and wherein a distance between each of the second multiple of axial crossover passages is larger than a size of one of the second multiple of axial crossover passages.

13. A vane for a gas turbine engine, comprising:
a first sidewall;
a first multiple of structural rib span segments that extend from the first sidewall;
a second sidewall;
a second multiple of structural rib span segments that extend from the second sidewall, the first multiple of structural rib span segments interleaved with the second multiple of structural rib span segments to form an interleaved structural rib that extends between the first sidewall and the second sidewall, wherein at least one of the first multiple structural rib span segments is directly abutting two of the second multiple of structural rib segments, the interleaved structural rib provides a multiple of axial crossover passages that are staggered adjacent to the respective sidewalls, the first and second multiple of structural rib span segments form a draft angle to control a number and a size of a multiple of axial crossover passages, a width W1 of the first and second structural rib span segments larger than a width W2 of the axial crossover passages due to a draft angle to form a blockage greater than 50%; and
a baffle adjacent to the interleaved structural rib.

14. The vane as recited in claim 13, further comprising a forward baffle section adjacent to the interleaved structural rib and an aft baffle section adjacent to the interleaved structural rib.

15. The vane as recited in claim 13, wherein the interleaved structural rib, the first sidewall and the second sidewall form the multiple of axial crossover passages.

16. The vane as recited in claim 13, wherein the interleaved structural rib forms a first multiple of axial crossover passages on a pressure side and a second multiple of axial crossover passages on a suction side.

17. The vane as recited in claim 16, wherein the first multiple of axial crossover passages are staggered from the second multiple of axial crossover passages.

18. A method of manufacturing a component of a gas turbine engine, the method comprising:
forming a first core die portion with a first multiple of structural rib span segments that extend from a first sidewall;
forming a second core die portion with a second multiple of structural rib span segments that extend from a second sidewall;
assembling the first core die portion and the second core die portion such that the first multiple of structural rib span segments are interleaved with the second multiple of structural rib span segments to form an interleaved structural rib, wherein at least one of the first multiple structural rib span segments is directly abutting two of the second multiple of structural rib segments, the interleaved structural rib provides a multiple of axial crossover passages that are staggered adjacent to the respective sidewalls, the first and second multiple of structural rib span segments form a draft angle to control a number and a size of a multiple of axial crossover passages;
injecting core material into the core die to create a core;
separating the core die portions;
inserting the core into a wax die;
injecting wax around the core;
forming a ceramic shell around the wax;
removing the wax;
injecting molten material into the shell and letting cool; and
removing the ceramic shell and core material.

19. The method as recited in claim 18, wherein a parting line between the first core die portion and the second core die portion zig-zags between a first multiple of axial crossover passages and a second multiple of axial crossover passages, and wherein the draft angle on surfaces of the first multiple of structural rib span segments and surfaces of the second multiple of structural rib span segments is between 1 and 5 degrees.

* * * * *